United States Patent
Hsiao et al.

(10) Patent No.: US 11,693,782 B2
(45) Date of Patent: Jul. 4, 2023

(54) CACHE MANAGEMENT METHOD USING OBJECT-ORIENTED MANNER AND ASSOCIATED MICROCONTROLLER

(71) Applicant: MEDIATEK INC., Hsin-Chu (TW)

(72) Inventors: Chih-Hsiang Hsiao, Hsinchu (TW); Chi-Hsuan Lin, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 19 days.

(21) Appl. No.: 17/090,895

(22) Filed: Nov. 6, 2020

(65) Prior Publication Data

US 2021/0056032 A1 Feb. 25, 2021

Related U.S. Application Data

(63) Continuation of application No. 16/402,242, filed on May 3, 2019, now Pat. No. 10,860,491.

(51) Int. Cl.
*G06F 12/0871* (2016.01)
*G06F 12/0868* (2016.01)

(52) U.S. Cl.
CPC ...... *G06F 12/0871* (2013.01); *G06F 12/0868* (2013.01); *G06F 2212/468* (2013.01); *G06F 2212/6046* (2013.01)

(58) Field of Classification Search
CPC ............. G06F 12/0871; G06F 12/0868; G06F 2212/468; G06F 2212/6046
See application file for complete search history.

(56) References Cited

U.S. PATENT DOCUMENTS

| | | | | |
|---|---|---|---|---|
| 5,752,272 A | * | 5/1998 | Tanabe | G06F 9/383 711/154 |
| 5,784,548 A | * | 7/1998 | Liong | G06F 1/30 714/6.24 |
| 7,451,225 B1 | * | 11/2008 | Todd | G06F 12/0862 709/229 |
| 8,270,196 B2 | | 9/2012 | Norman | |
| 8,467,244 B2 | | 6/2013 | Jeon | |
| 8,843,435 B1 | | 9/2014 | Trefler | |
| 2003/0120357 A1 | | 6/2003 | Battistutto | |
| 2004/0225843 A1 | | 11/2004 | Vaidya | |

(Continued)

FOREIGN PATENT DOCUMENTS

WO 2015/097751 A1 7/2015

OTHER PUBLICATIONS

Carter, John, et al. "Impulse: Building a smarter memory controller." Proceedings Fifth International Symposium on High-Performance Computer Architecture. IEEE, 1999. (Year: 1999).*

(Continued)

*Primary Examiner* — Charles Rones
*Assistant Examiner* — Hewy H Li
(74) *Attorney, Agent, or Firm* — Winston Hsu

(57) ABSTRACT

The present invention provides a microcontroller, wherein the microcontroller includes a processor, a first memory and a cache controller. The first memory includes at least a working space. The cache controller is coupled to the first memory, and is arranged for managing the working space of the first memory, and dynamically loading at least one object from a second memory to the working space of the first memory in an object-oriented manner.

17 Claims, 7 Drawing Sheets

(56) References Cited

U.S. PATENT DOCUMENTS

| | | | |
|---|---|---|---|
| 2005/0172049 A1* | 8/2005 | Kamei | G06F 12/1027 |
| | | | 710/22 |
| 2007/0294496 A1 | 12/2007 | Goss | |
| 2008/0256302 A1* | 10/2008 | Maron | G06F 12/0862 |
| | | | 711/137 |
| 2010/0180081 A1* | 7/2010 | Bose | G06F 1/3203 |
| | | | 711/E12.024 |
| 2011/0296095 A1 | 12/2011 | Su | |
| 2012/0072643 A1 | 3/2012 | Thill | |
| 2012/0084497 A1* | 4/2012 | Subramaniam | G06F 9/3816 |
| | | | 711/E12.024 |
| 2013/0077382 A1 | 3/2013 | Cho | |
| 2013/0215069 A1 | 8/2013 | Lee | |
| 2014/0244960 A1 | 8/2014 | Ise | |
| 2014/0304475 A1 | 10/2014 | Ramanujan | |
| 2016/0253264 A1* | 9/2016 | Bose | G06F 11/3024 |
| | | | 711/137 |
| 2016/0321183 A1* | 11/2016 | Govindan | G06F 1/3296 |
| 2016/0371187 A1* | 12/2016 | Roberts | G06F 12/0835 |
| 2017/0068304 A1 | 3/2017 | Lee | |
| 2017/0132144 A1 | 5/2017 | Solihin | |
| 2018/0107399 A1 | 4/2018 | Hsiao | |

OTHER PUBLICATIONS

Mittal, Sparsh. "A survey of recent prefetching techniques for processor caches." ACM Computing Surveys (CSUR) 49.2 (2016): 1-35. (Year: 2016).*

Drepper, Ulrich. "What every programmer should know about memory." Red Hat, Inc 11 (2007) p. 14-15, 36. (Year: 2007).*

Hennessy, John L. and Patternson, David A. "Computer Architecture: A Quantitative Approach". 3rd ed. Morgan Kaufman Publishers. San Francisco. 2003. p. 398-399. (Year: 2003).*

* cited by examiner

CACHE MANAGEMENT METHOD USING OBJECT-ORIENTED MANNER AND ASSOCIATED MICROCONTROLLER

CROSS REFERENCE TO RELATED APPLICATION

This is a continuation of the co-pending U.S. application Ser. No. 16/402,242 (filed on May 3, 2019). The entire content of the related applications is incorporated herein by reference.

BACKGROUND

For an embedded microcontroller (MCU) system, because cache memory (e.g. static random access memory (SRAM)) is expensive, a large/slower/higher power memory such as dynamic random access memory (DRAM) is generally used with the cache to provide large memory space; however, this arrangement costs much power consumption. In some ultra-low-power applications such as a sensor hub or a pedometer, the DRAM power consumption is too high for these ultra-low-power applications, so the DRAM must be powered down during some periods to save power. However, because the current cache line is too small, it is easy to access DRAM randomly, causing the DRAM not able to sleep long enough to save power, and the overhead of the DRAM is increased due to the frequent power on/off.

SUMMARY

It is therefore an objective of the present invention to provide a cache management method which can manage the objects loaded from the DRAM to the cache by using an object-oriented manner. By using the cache management method of the present invention, the DRAM may be powered down longer with less overhead, to solve the above-mentioned problems.

According to one embodiment of the present invention, a microcontroller comprises a processor, a first memory and a cache controller. The first memory comprises at least a working space. The cache controller is coupled to the first memory, and is arranged for managing the working space of the first memory, and dynamically loading at least one object from a second memory to the working space of the first memory in an object-oriented manner.

According to another embodiment of the present invention, a cache management method is provided, and the cache management method comprises the steps of: providing a first memory having a working space; and using a cache controller to dynamically load at least one object from a second memory to the working space of the first memory in an object-oriented manner.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
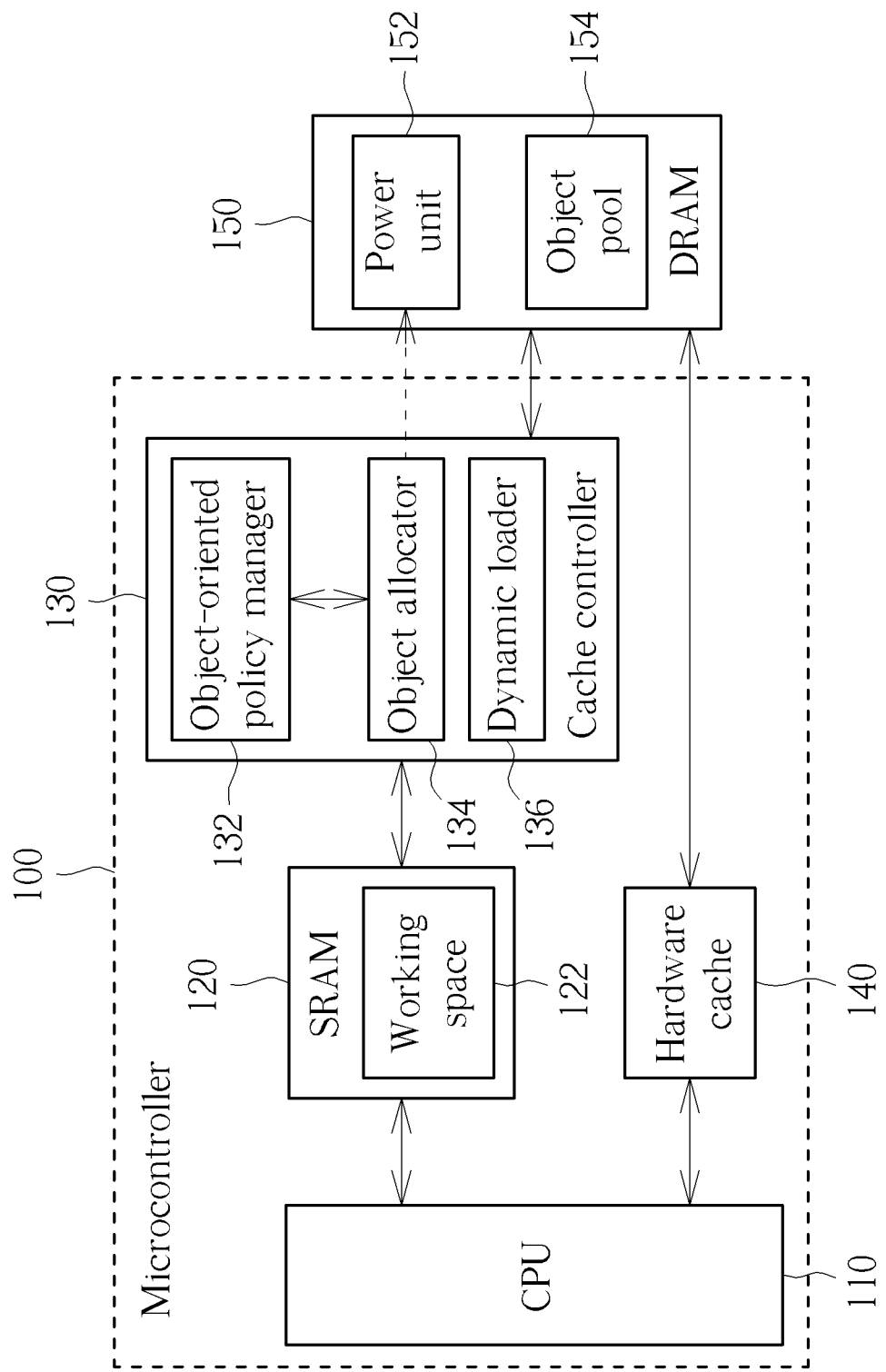
FIG. 1 is a diagram illustrating a microcontroller according to one embodiment of the present invention.

FIG. 1 is a diagram illustrating a microcontroller (MCU) 100 according to one embodiment of the present invention. As shown in FIG. 1, the microcontroller 100 comprises a Central Processing Unit (CPU) 110, a memory such as a static random access memory (SRAM) 120, a cache controller 130 and a hardware cache 140, where the SRAM 120 comprises at least a working space 122, and the cache controller 130 comprises an object-oriented policy manager 132, an object allocator 134 and a dynamic loader 136. In this embodiment, the cache controller 130 is used to manage the working space 122, and the cache controller 130 is implemented by pure software (that is, the operations of the cache controller 130 is performed by executing program codes), without a limitation of the present invention.

The microcontroller 100 is coupled to a DRAM 150 having a power unit 152 and an object pool 154, and the microcontroller 100 loads objects from the object pool 154 to execute the corresponding functions, where the term "object" is a collection of code or data for specific functionality, and is able to be linked and loaded to the SRAM 120 to be executed. In detail, the dynamic loader 136 of the cache controller 130 loads the objects from the program pool 152 to the working space 122 of the SRAM 120, and the CPU 110 reads and executes the loaded objects in the working space 122.

In this embodiment, the hardware cache 140 serves as an optimization tool for the operations of the cache controller 130. In detail, when the microcontroller 100 has a low power feature, the hardware cache 140 may be used to group tasks to increase locality for cache, and dispatch tasks which have no ultra-low-power requirement to cache DRAM 150 to save the usage of the cache controller 130. When microcontroller 100 has a ultra-low-power feature, the hardware cache 140 may not work for storing the objects corresponding to the ultra-low-power requirement to prevent the DRAM 150 being accessed more frequently.

In order to save the power of a system comprising the microcontroller 100 and the DRAM 150, the cache controller 130 can manage the objects in the SRAM 120 and the DRAM 150 in an object-oriented matter, to make the DRAM 150 not be powered on/off more frequently. In detail, the object-oriented policy manager 132 is arranged to provide at least one cache policy indicating relationships of a plurality of objects. The object allocator 134 is arranged to refer to the cache policy provided by the object-oriented policy manager 132 to determine at least one object, and the dynamic loader 136 loads the at least one of the objects, determined by the object allocator 134, from the DRAM 150 to the SRAM 120. By using the cache controller 130 to load the objects in the object-oriented manner, the object allocator 134 can control the power unit 152 of the DRAM 150 more efficiently to save power to make the system be suitable for the ultra-low-power applications such as the sensor hub or the pedometer.

Specifically, the cache policies are programmable by the user or the user scenario analyzed by a processor, for example the cache policy may be a group policy and/or an exclusive policy. The group policy may indicate a plurality of specific objects that are always used together, and if one of the specific objects is to be loaded from the object pool 154 to the working space 122, the other specific objects are loaded to the working space 122 simultaneously. The exclusive policy may indicate a plurality of specific objects that are never used together, and if one of the specific objects is to be loaded from the object pool 154 to the working space 122, the dynamic loader 136 moves the other specific objects, if any, from the working space 122 to the object pool 154.

Figure 2:
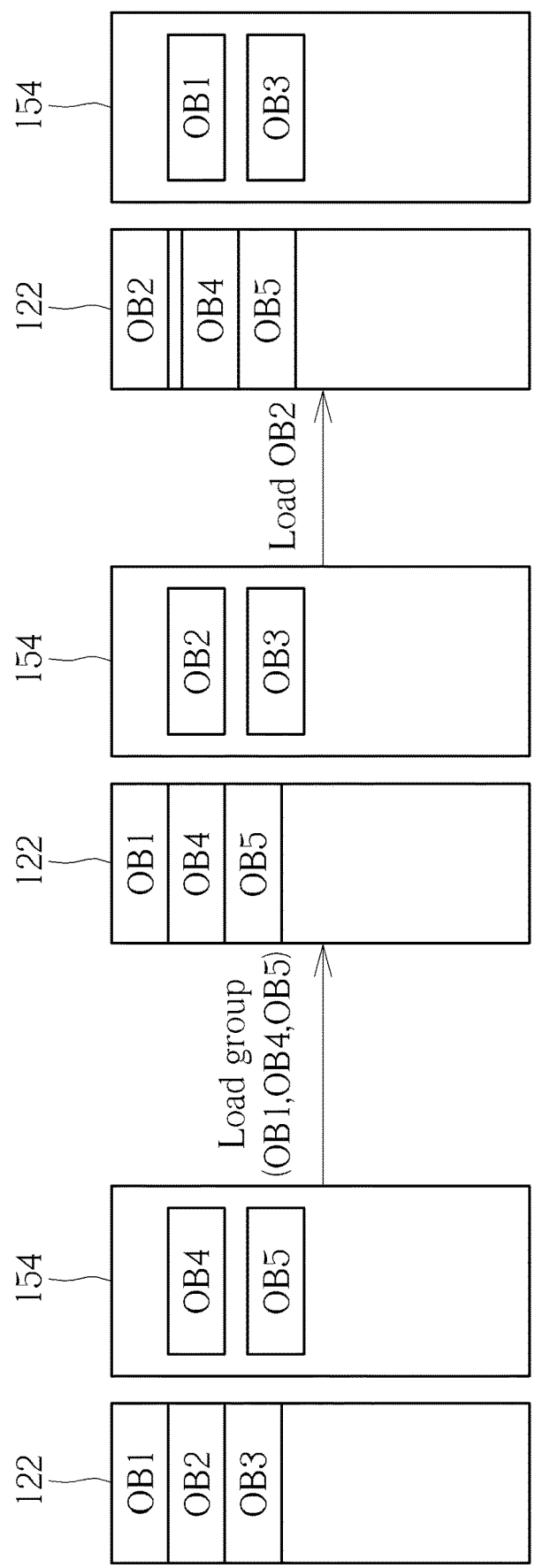
FIG. 2 shows the managements of the working space and the object pool when the group policy is applied according to a first embodiment of the present invention.

FIG. 2 shows the managements of the working space 122 and the object pool 154 when the group policy is applied according to a first embodiment of the present invention. As shown in FIG. 2, it is assumed that objects OB1, OB4 and OB5 are grouped by the object-oriented policy manager 132, and in the beginning the working space 122 stores objects OB1, OB2 and OB3, and the object pool 154 stores the objects OB4 and OB5. According to the group policy of the object-oriented policy manager 132, the objects OB2 and OB3 following the object OB1 within the working space 122 are moved to the object pool 154 of the DRAM 150 to release the space, then the objects OB4 and OB5 are pre-fetched from the object pool 154 to the working space 122, wherein the objects OB4 and OB5 are positioned following the object OB1 (i.e. no fragmentation in the group (OB1, OB4 and OB5)). In addition, if the object OB2 is required to be loaded to the working space 122, the object OB1 can be moved to the object pool 154, without moving the objects OB4 and OB5 in the working space, then the object OB2 is moved to the working space 122. In the embodiment shown in FIG. 2, because the objects OB4 and OB5 are pre-fetched, and the objects of the same group are stored together within the working space, the operation efficiency of the system can be improved and the frequent switching (i.e. switching objects between the SRAM 120 and the DRAM 150) can be prevented.

Figure 3:
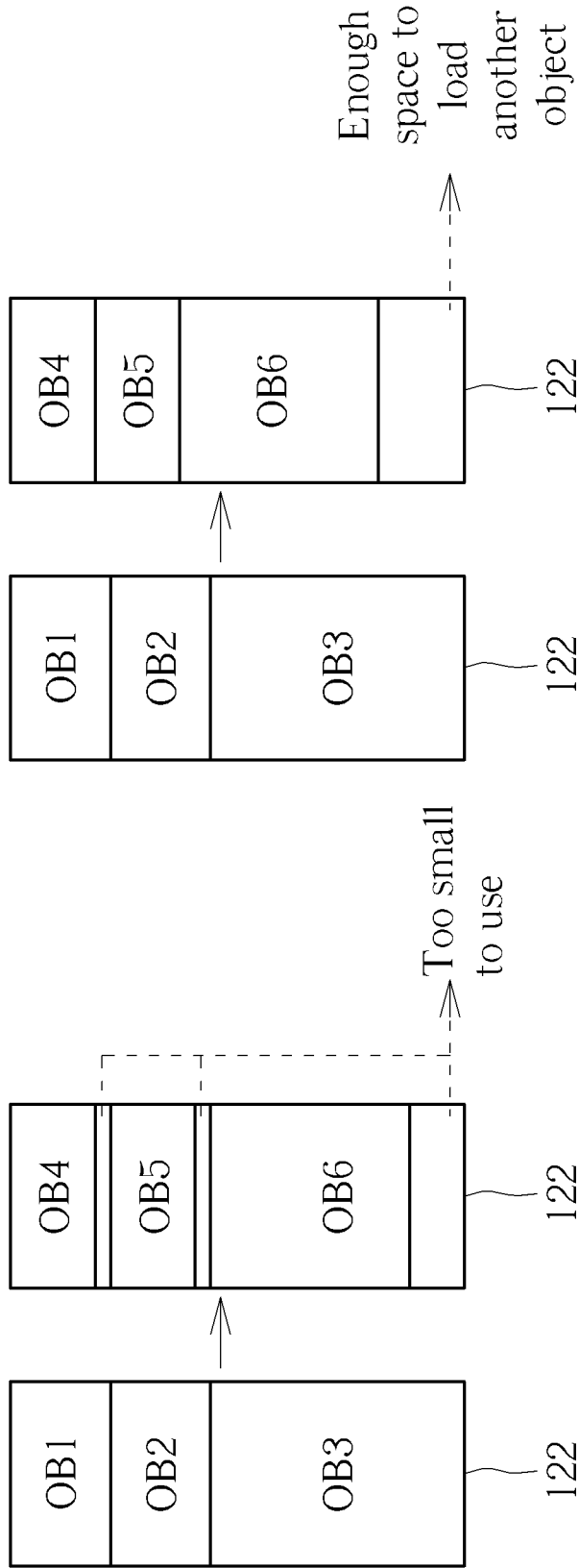
FIG. 3 shows the managements of the working space and the object pool when the group policy is applied according to a second embodiment of the present invention.

FIG. 3 shows the managements of the working space 122 and the object pool 154 when the group policy is applied according to a second embodiment of the present invention. In the case shown in FIG. 3, it is assumed that the objects OB1-OB6 are sequentially used by the CPU 110, that is the objects OB1-OB6 are sequentially loaded from the object pool 154 to the working space 122. In the prior art, initially the objects OB1-OB3 are sequentially stored in the working space 122, then the object OB1 is moved from the working space to release the space 122 for storing the object OB4, the object OB2 is moved from the working space 122 to release the space for storing the object OB5, and the object OB3 is moved from the working space 122 to release the space for storing the object OB6. As shown in FIG. 3, the prior art method will cause some fragmentary spaces between the objects OB4-OB6, and these fragmentary spaces are generally too small to be used. On the contrary, in the group policy of the embodiment, the objects OB1-OB3 can be set as a first group, and the objects OB4-OB6 can be set as a second group, and the objects OB1-OB3 are moved together to make the objects OB4-OB6 can be loaded into the working space 122 simultaneously. By using the group policy of the embodiment, because there is no fragmentary space between the objects OB4-OB6, the working space 122 may have enough space to load another object.

Figure 4:
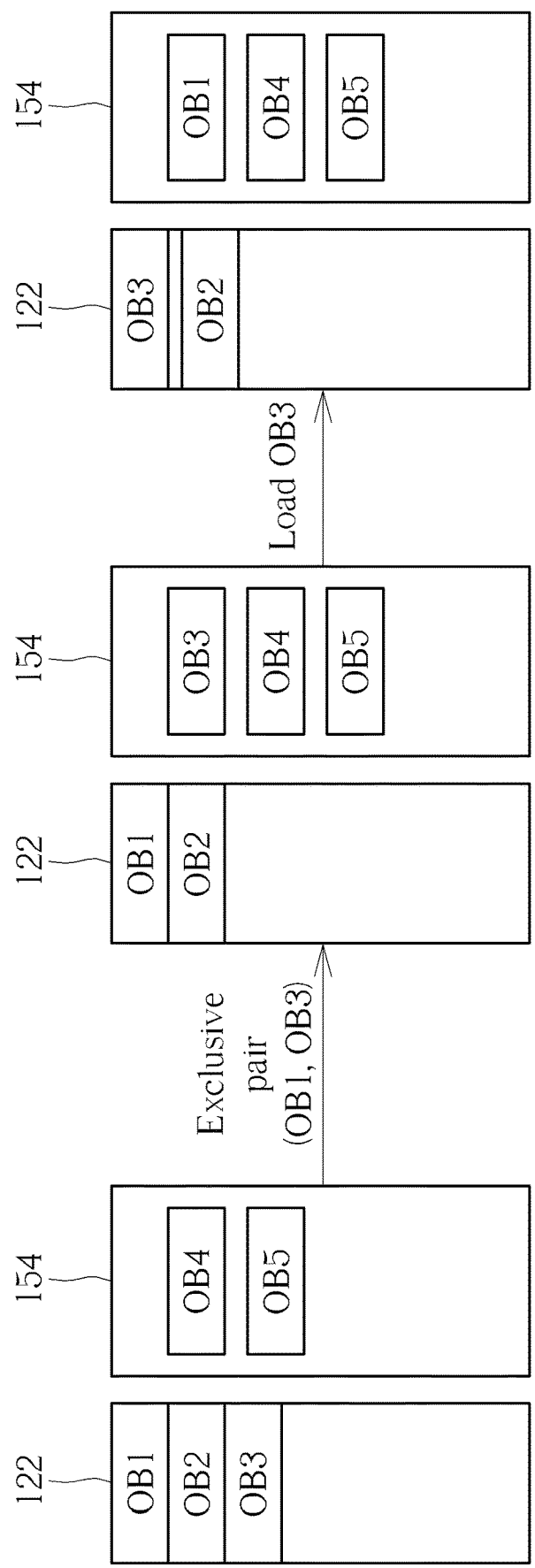
FIG. 4 shows the managements of the working space and the object pool when the exclusive policy is applied according to a first embodiment of the present invention.

FIG. 4 shows the managements of the working space 122 and the object pool 154 when the exclusive policy is applied according to a first embodiment of the present invention. As shown in FIG. 4, it is assumed that objects OB1 and OB3 are grouped by the object-oriented policy manager 132, and in the beginning the working space 122 stores objects OB1, OB2 and OB3, and the object pool 154 stores the objects OB4 and OB5. According to the exclusive policy of the object-oriented policy manager 132, the object OB3 is moved to the object pool 154 of the DRAM 150 to release the space. Then, if the object OB3 is required to be loaded to the working space 122, the object OB1 can be moved to the object pool 154 first, then the object OB3 is moved to the working space 122. In the embodiment shown in FIG. 4, because the objects within the group are not loaded simultaneously, the frequent switching can be prevented and the average loading overhead can be reduced.

Figure 5:
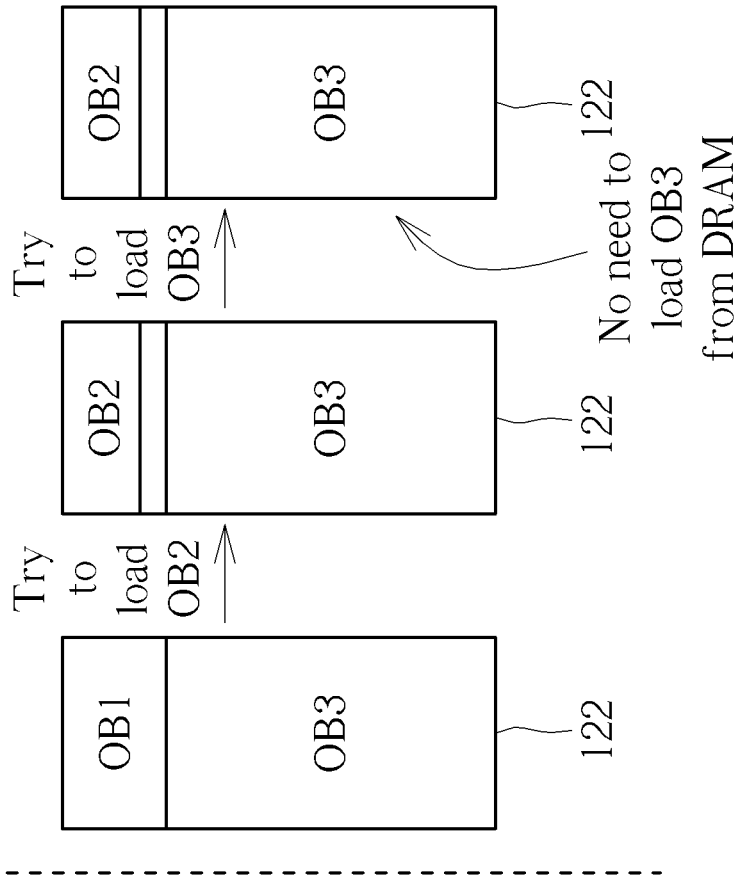
FIG. 5 shows the managements of the working space and the object pool when the exclusive policy is applied according to a second embodiment of the present invention.
Figure 5:
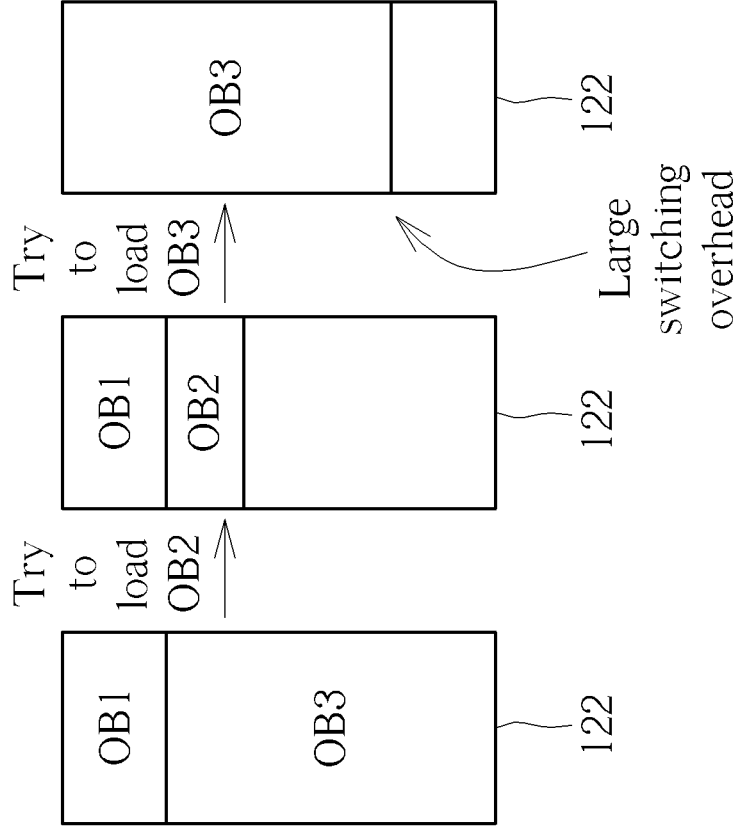

FIG. 5 shows the managements of the working space 122 and the object pool 154 when the exclusive policy is applied according to a second embodiment of the present invention. In the case shown in FIG. 5, it is assumed that the objects OB3, OB2 and OB1 are sequentially and repeatedly used by the CPU 110, that is the objects OB3, OB2 and OB1 are sequentially loaded from the object pool 154 to the working space 122 repeatedly. In the prior art, initially the objects OB1 and OB3 are stored in the working space 122, then the object OB2 is tried to be loaded into the working space 122. Because the working space 122 does not have enough space for storing the object OB2, the object OB3 is moved from the working space 122 by using a least recently used (LRU) mechanism, and the object OB2 is stored in the working space 122. Then, the object OB3 is tried to be loaded into the working space 122. Because the object OB3 has a larger size, both the objects OB1 and OB2 are required to be moved to the DRAM 150 to release the space for storing the object OB3, causing large switching overhead. On the contrary, in the exclusive policy of the embodiment, the objects OB1 and OB2 can be set as exclusive, that is when the object OB2 is tried to be loaded to the working space 122, the object OB1 is moved from the working space 122 to release the space for storing the object OB2, and the object OB3 is no need to be moved even if the object OB3 is the least recently used object. Therefore, there is no need to load the object OB3 in the next cycle, and the switching overhead can be greatly improved.

Figure 6:
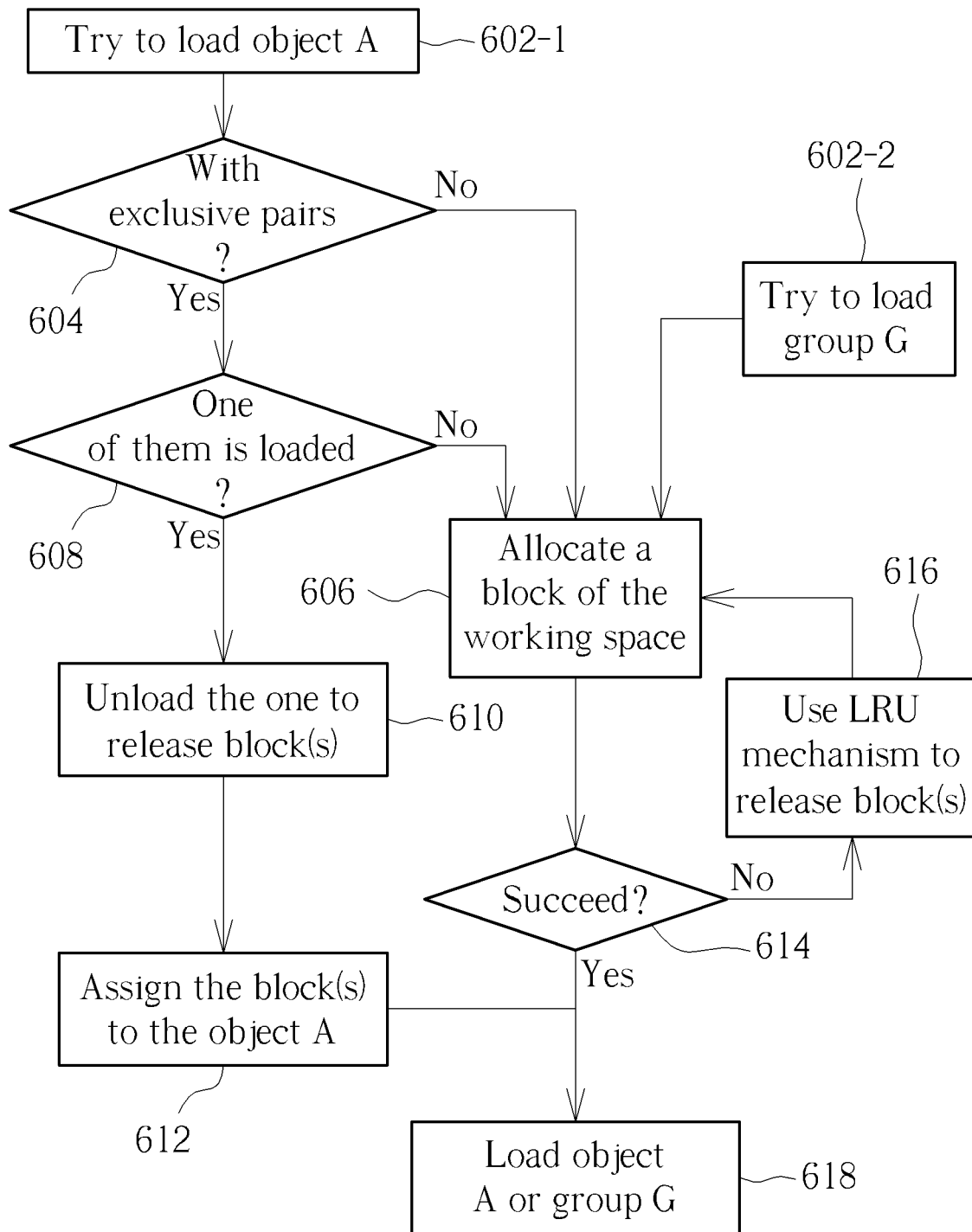
FIG. 6 is a flowchart of a cache management method according to one embodiment of the present invention.

FIG. 6 is a flowchart of a cache management method according to one embodiment of the present invention. Referring to FIGS. 1-5 and related descriptions, the flowchart is described as follows.

Step 602: the cache controller 130 tries to load an object A from the DRAM 150 (Step 602-1) or the cache controller 130 tries to load a group G comprising a plurality of objects from the DRAM 150 (Step 602-2).

Step 604: the cache controller 130 determines if the exclusive policy is applied and the object A has an exclusive pair. If yes, the flow enters Step 608; and if not, the flow enters Step 606.

Step 606: the cache controller 130 allocates a block within the working space 122 for storing the object A or the group G.

Step 608: the cache controller 130 determines if one of the exclusive pairs has been loaded into the working space 122. If yes, the flow enters Step 610; and if not, the flow enters Step 606.

Step 610: the cache controller 130 unloads the one of the exclusive pairs to release block(s).

Step 612: the cache controller 130 assigns the block(s) to the object A.

Step 614: the cache controller 130 determines if the block assignment succeeds. If yes, the flow enters Step 618; if not, the flow enters Step 616.

Step 616: the cache controller 130 uses the LRU mechanism to release/free block(s) of the working space 122, and the flow goes back to the Step 606.

Step 618: the cache controller 130 loads the object A or the group G from the DRAM 150 to the working space 122.

Figure 7:
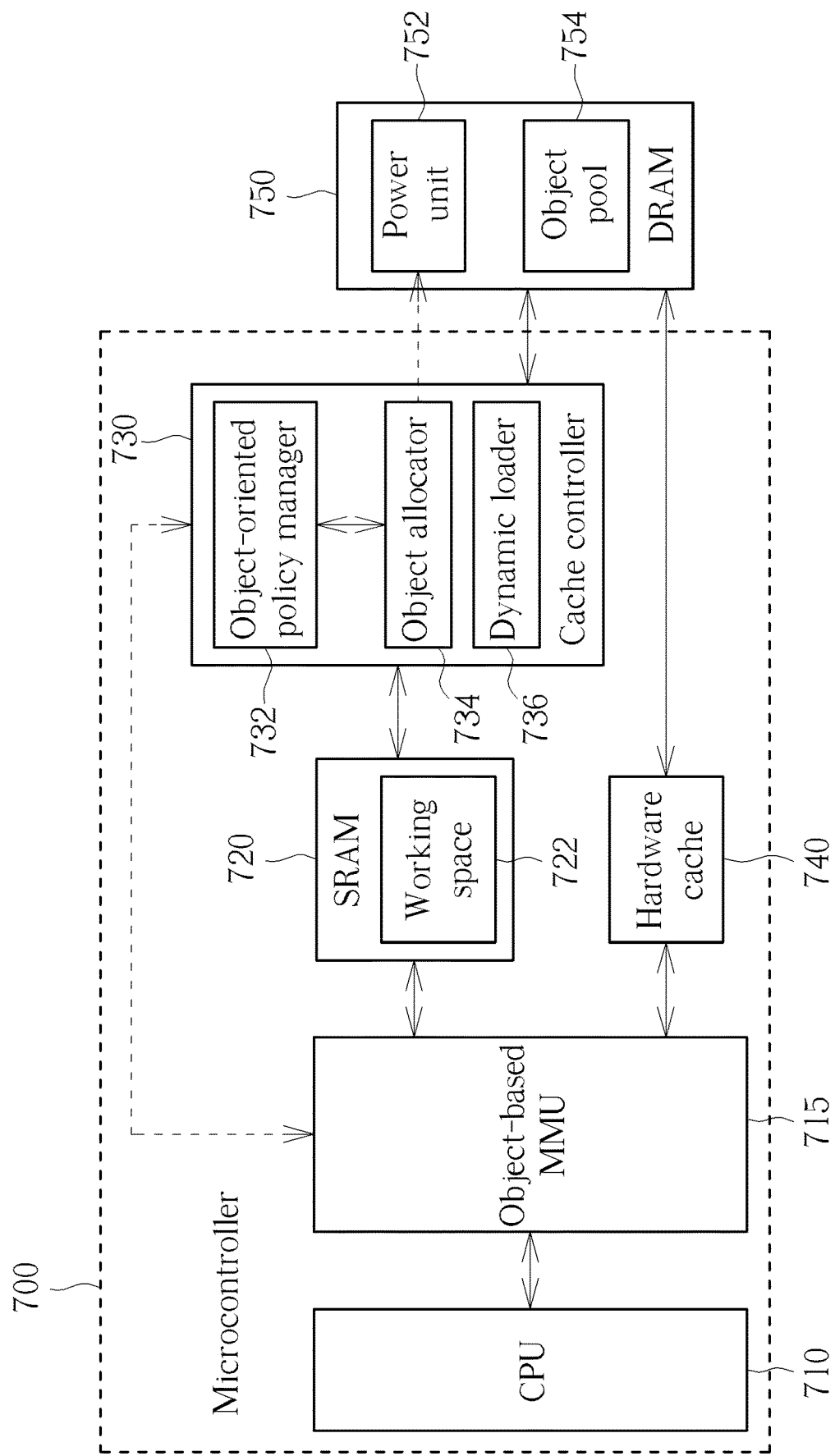
FIG. 7 is a diagram illustrating a microcontroller according to another embodiment of the present invention.

FIG. 7 is a diagram illustrating a microcontroller 700 according to another embodiment of the present invention. As shown in FIG. 7, the microcontroller 700 comprises a CPU 710, a memory such as a SRAM 720, an object-based memory management unit (MMU) 715, a cache controller 730 and a hardware cache 740, where the SRAM 720 comprises at least a working space 722, and the cache controller 730 comprises an object-oriented policy manager 732, an object allocator 734 and a dynamic loader 736. In this embodiment, the cache controller 730 is used to manage the working space 722, and the cache controller 730 is implemented by pure software. In addition, the microcontroller 700 is coupled to a DRAM 750 having a power unit 752 and an object pool 754. The microcontroller 700 is similar to the microcontroller 100 shown in FIG. 1, and the only difference is that the microcontroller 700 further comprises the object-based MMU 715. The object-based MMU 715 can provide virtual address and physical address mapping for the CPU 710 and the memory 720 and 740, and the cache controller 730 may send a control signal to modify the object-based MMU 715 to change objects between hardware cache 740 and the software cache (i.e. SRAM 720). Because a person skilled in the art should understand the operations of the microcontroller 700 after reading the embodiments of FIGS. 1-6, further descriptions are omitted here.

Briefly summarized, in the cache management method and the microcontroller of the present invention, a cache controller having the object-oriented policy is used to manage the objects of the SRAM and the DRAM. The cache management method of the embodiments can access DRAM efficiently and lower the overhead of the SRAM to make the microcontroller be used in the ultra-low-power application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A microcontroller, comprising:
   a processor;
   a first memory, coupled to the processor, wherein the first memory comprises at least a working space;
   a cache controller, coupled to the first memory, for managing the working space of the first memory, and dynamically loading at least one object from a second memory to the working space of the first memory in an object-oriented manner;
   wherein the cache controller refers to at least one cache policy indicating relationships of a plurality of objects to determine at least one of the objects, and loads the at least one of the objects from the second memory to the working space of the first memory;
   wherein the at least one cache policy comprises an exclusive policy indicating a plurality of specific objects that are never used at a same time.

2. The microcontroller of claim 1, wherein the at least one cache policy is programmable.

3. The microcontroller of claim 1, wherein the at least one cache policy comprises a group policy indicating a plurality of specific objects that are always used together.

4. The microcontroller of claim 1, wherein the at least one cache policy comprises a group policy indicating a plurality of specific objects, and when one of the specific objects is to be loaded, the dynamic loader loads all of specific objects from the second memory to the working space of the first memory simultaneously.

5. The microcontroller of claim 1, wherein the cache controller is implemented by software.

6. The microcontroller of claim 5, wherein the microcontroller further comprises:
   a memory management unit, coupled between the processor, the first memory and the hardware cache, for providing a virtual address and physical address mapping operation.

7. The microcontroller of claim 1, wherein the second memory is a dynamic random access memory (DRAM), and the cache controller is further arranged to control a power of the second memory.

8. A microcontroller, comprising:
   a processor;
   a first memory, coupled to the processor, wherein the first memory comprises at least a working space;
   a cache controller, coupled to the first memory, for managing the working space of the first memory, and dynamically loading at least one object from a second memory to the working space of the first memory in an object-oriented manner;
   wherein the cache controller refers to at least one cache policy indicating relationships of a plurality of objects to determine at least one of the objects, and loads the at least one of the objects from the second memory to the working space of the first memory;
   wherein the at least one cache policy comprises a group policy indicating a plurality of specific objects, and when one of the specific objects is to be loaded from the second memory to the working space of the first memory, the dynamic loader moves the other specific objects, if any, from the working space of the first memory to the second memory.

9. The microcontroller of claim 8, wherein the cache controller is implemented by software.

10. The microcontroller of claim 9, wherein the microcontroller further comprises:
    a memory management unit, coupled between the processor, the first memory and the hardware cache, for providing a virtual address and physical address mapping operation.

11. The microcontroller of claim 8, wherein the second memory is a dynamic random access memory (DRAM), and the cache controller is further arranged to control a power of the second memory.

12. A cache management method, comprising:
providing a first memory having a working space; and
using a cache controller to dynamically load at least one object from a second memory to the working space of the first memory in an object-oriented manner;
wherein the step of using the cache controller to dynamically load the at least one object from the second memory to the working space of the first memory in the object-oriented manner comprises:
referring to at least one cache policy indicating relationships of a plurality of objects to determine at least one of the objects; and
loading the at least one of the objects from the second memory to the working space of the first memory;
wherein the at least one cache policy comprises an exclusive policy indicating a plurality of specific objects that are never used at a same time.

13. The cache management method of claim 12, wherein the at least one cache policy is programmable.

14. The cache management method of claim 12, wherein the at least one cache policy comprises a group policy indicating a plurality of specific objects, and when one of the specific objects is to be loaded, all of specific objects are loaded from the second memory to the working space of the first memory simultaneously.

15. The cache management method of claim 12, wherein the at least one cache policy comprises a group policy indicating a plurality of specific objects, and when one of the specific objects is to be loaded from the second memory to the working space of the first memory, the other specific objects are removed from the working space of the first memory to the second memory, if any.

16. The cache management method of claim 12, wherein the cache controller is implemented by software.

17. The cache management method of claim 12, wherein the second memory is a dynamic random access memory (DRAM), and the cache controller is further arranged to control a power of the second memory.

\* \* \* \* \*